US012654404B2

(12) United States Patent
Newcomb et al.

(10) Patent No.: US 12,654,404 B2
(45) Date of Patent: Jun. 16, 2026

(54) HYBRID TRANSPARENT STRUCTURAL COMPOSITE

(71) Applicant: GM GLOBAL TECHNOLOGY OPERATIONS LLC, Detroit, MI (US)

(72) Inventors: Bradley Allen Newcomb, Troy, MI (US); Bhavesh Shah, Troy, MI (US); Joseph M. Polewarczyk, Lake Orion, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 600 days.

(21) Appl. No.: 18/106,590

(22) Filed: Feb. 7, 2023

(65) Prior Publication Data

US 2024/0262047 A1    Aug. 8, 2024

(51) Int. Cl.
*B29C 70/08* (2006.01)
*B29C 45/14* (2006.01)
*B29C 70/68* (2006.01)
*B29C 70/88* (2006.01)
(Continued)

(52) U.S. Cl.
CPC ............ *B29C 70/088* (2013.01); *B29C 45/14* (2013.01); *B29C 70/68* (2013.01); *B29C 70/682* (2013.01); *B29C 70/683* (2013.01); *B29C 70/681* (2013.01); *B29C 70/882* (2013.01); *B29C 70/885* (2013.01); *B29K 2705/00* (2013.01); *B29K 2995/0026* (2013.01); *B29L 2031/3002* (2013.01)

(58) Field of Classification Search
CPC ....... B29C 70/088; B29C 45/14; B29C 70/68; B29C 70/682; B29C 70/683; B29C 70/681; B29C 70/882; B29C 70/885; B29K 2705/00; B29K 2995/0026; B29L 2031/3002
See application file for complete search history.

(56) References Cited

U.S. PATENT DOCUMENTS 7,651,756 B2 * 1/2010 Albers .................... B32B 3/266
                                                428/140
7,846,366 B2 * 12/2010 Iobst ...................... B29C 43/14
                                                264/294

(Continued)

FOREIGN PATENT DOCUMENTS

DE            29516548 U1     3/1996
DE      102009042272 A1 *    3/2011    ......... B29C 45/1418

OTHER PUBLICATIONS

German Office Action from counterpart DE1020231229656, dated Dec. 4, 2024.

(Continued)

*Primary Examiner* — Ryan J. Walters

(57) ABSTRACT

A method for fabricating a hybrid transparent composite structure includes providing a metallic insert and a transparent composite preform including reinforcing fibers and transparent resin; heating the transparent composite preform; and arranging the metallic insert and the transparent composite preform in a mold and applying at least one of heat and pressure to form the hybrid transparent composite structure. At least a portion of the transparent composite preform is not obscured by the metallic insert and allows viewing through the hybrid transparent composite structure.

20 Claims, 7 Drawing Sheets

(51) Int. Cl.
    *B29K 705/00*      (2006.01)
    *B29L 31/30*      (2006.01)

(56)           References Cited

U.S. PATENT DOCUMENTS

| | | | | |
|---|---|---|---|---|
| 8,840,827 | B2 * | 9/2014 | Lobst | B29C 70/46 |
| | | | | 264/319 |
| 9,227,673 | B2 * | 1/2016 | Berger | B62D 29/001 |
| 11,267,514 | B2 | 3/2022 | Aitharaju et al. | |
| 11,358,647 | B1 | 6/2022 | Newcomb et al. | |
| 11,383,771 | B1 | 7/2022 | Newcomb et al. | |
| 11,420,683 | B2 | 8/2022 | Newcomb et al. | |
| 11,541,939 | B2 | 1/2023 | Newcomb et al. | |
| 2005/0053765 | A1 * | 3/2005 | Albers | B32B 3/266 |
| | | | | 428/138 |
| 2005/0079779 | A1 * | 4/2005 | McLeod | B29C 70/82 |
| | | | | 442/19 |
| 2015/0151796 | A1 * | 6/2015 | Berger | B29C 70/68 |
| | | | | 296/193.06 |
| 2015/0298368 | A1 * | 10/2015 | Krahnert | B29C 43/021 |
| | | | | 264/154 |
| 2016/0375661 | A1 * | 12/2016 | Dalal | B32B 5/12 |
| | | | | 156/308.2 |
| 2022/0212449 | A1 | 7/2022 | Newcomb et al. | |

OTHER PUBLICATIONS

U.S. Appl. No. 17/406,023, filed Aug. 18, 2021, Newcomb et al.
U.S. Appl. No. 17/406,024, filed Aug. 18, 2021, Newcomb et al.
U.S. Appl. No. 17/584,557, filed Jan. 26, 2022, Newcomb et al.
U.S. Appl. No. 17/667,260, filed Feb. 8, 2022, Newcomb et al.
U.S. Appl. No. 17/699,696, filed Mar. 21, 2022, Newcomb et al.
U.S. Appl. No. 17/825,041, filed May 26, 2022, Newcomb et al.
U.S. Appl. No. 17/845,333, filed Jun. 21, 2022, Newcomb et al.
U.S. Appl. No. 17/899,127, filed Aug. 30, 2022, Newcomb et al.
U.S. Appl. No. 17/968,401, filed Oct. 18, 2022, Newcomb et al.

* cited by examiner

HYBRID TRANSPARENT STRUCTURAL COMPOSITE

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to composite structures, and more particularly to hybrid transparent structural composites.

The efficiency of a vehicle is impacted by the weight of the vehicle. To reduce weight, some vehicles use structural composites instead of stamped steel or aluminum.

SUMMARY

A method for fabricating a hybrid transparent composite structure includes providing a metallic insert and a transparent composite preform including reinforcing fibers and transparent resin; heating the transparent composite preform; and arranging the metallic insert and the transparent composite preform in a mold and applying at least one of heat and pressure to form the hybrid transparent composite structure. At least a portion of the transparent composite preform is not obscured by the metallic insert and allows viewing through the hybrid transparent composite structure.

In other features, providing the transparent composite preform includes stitching the reinforcing fibers to a substrate; and encapsulating the reinforcing fibers and the substrate in the transparent resin.

In other features, the method includes at least one of cutting, forming, and shaping the metallic insert prior to applying heat and pressure using the mold. The metallic insert includes mesh. The metallic insert includes an interlocking hole. The method includes injecting transparent resin into the mold. The metallic insert is selected from a group consisting of steel, aluminum, and magnesium. The reinforcing fibers comprise a material selected from a group consisting of carbon fibers, glass fibers, and basalt. The reinforcing fibers comprise commingled fibers made of at least two different materials. The reinforcing fibers including commingled fibers including at least one material selected from a group consisting of carbon fibers, glass fibers, and basalt and at least one material selected from a group consisting of nylon, acrylic, and polycarbonate.

In other features, the hybrid transparent composite structure is an A pillar.

In other features, the hybrid transparent composite structure is a vehicle header and the method further comprises connecting the hybrid transparent composite structure between roof rails of a vehicle.

A method for fabricating a hybrid transparent composite structure includes providing a metallic insert; arranging reinforcing fibers on the metal insert; arranging the metallic insert with the reinforcing fibers in a mold; supplying transparent resin to the mold; and applying at least one of heat and pressure to form the hybrid transparent composite structure. At least a portion of the hybrid transparent composite structure is not obscured by the metallic insert and allows viewing through the hybrid transparent composite structure.

In other features, the method includes arranging the reinforcing fibers on the metallic insert is performed by a robot using an automated process. The method includes at least one of cutting, forming, and shaping the metallic insert prior to applying the reinforcing fibers. The method includes heating the metallic insert with the reinforcing fibers prior to arranging the metallic insert with the reinforcing fibers in the mold. The metallic insert includes an interlocking hole.

In other features, the metallic insert is selected from a group consisting of steel, aluminum, and magnesium. The reinforcing fibers comprise a material selected from a group consisting of carbon fibers, glass fibers, and basalt.

In other features, the reinforcing fibers comprise commingled fibers made of at least two different materials. The hybrid transparent composite structure is a vehicle header and further comprising connecting the hybrid transparent composite structure between roof rails of a vehicle. Arranging reinforcing fibers on the metal insert includes stitching the reinforcing fibers onto a substrate and attaching the substrate to the metal insert.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1C:
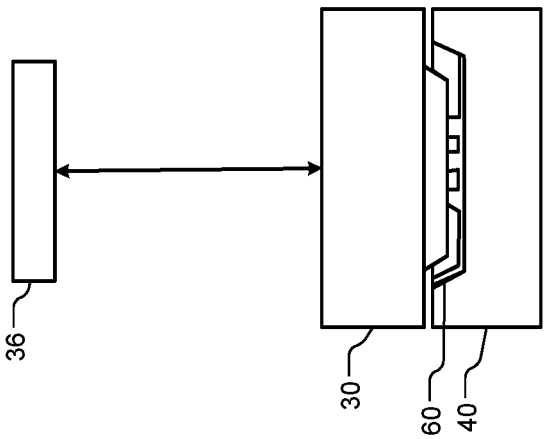
FIGS. 1B and 1C are side cross-sectional views of an example of a transparent composite preform and a metallic insert arranged in a compression mold according to the present disclosure.

While the following description relates to a hybrid transparent composite structure used as a structural component in a vehicle, the hybrid transparent composite structure can be used in non-vehicular applications.

In some examples, a hybrid transparent composite structure includes a metallic insert and a fiber reinforced composite material and local transparent portions to allow viewing through the hybrid transparent composite structure. As used herein, the term transparent encompasses materials that allow light to pass through to materials that are optically transparent. In some examples, the hybrid transparent composite structure is formed using compression, injection, or injection-compression molding. The hybrid transparent composite structure includes one or more transparent portions to allow viewing through the hybrid transparent composite structure (and other non-transparent portions where reinforcing fibers and/or the metallic insert are located). In other examples, the hybrid transparent composite structure is formed in a single compression, injection, or injection-compression process step with local transparency and continuous or discontinuous fiber reinforcements.

In some examples, the hybrid transparent composite structure includes interlocking holes or meshed portions in the metallic insert to interlock the transparent resin to the metallic insert. In some examples, the reinforcing fiber includes the same type of fiber (e.g., carbon fiber) or two or more comingled reinforcing fibers (e.g., glass fiber and carbon fiber) to balance mass, performance, and/or corrosion. For example, glass fibers may be used in regions where metal fasteners are used or in regions in direct contact with the metallic insert.

In some examples, portions of the fiber reinforced composite are void of reinforcing fiber to allow standard metal-to-metal physical joining methods using fasteners or welding and/or to enable transparent portions.

In some examples, the metallic insert is made of a material such as steel, press hardened steel, aluminum, magnesium, or other material that is preformed, stamped, and/or shaped prior to consolidation, where a single compression, injection, or injection-compression process is not suitable.

In some examples, a dry reinforcing fiber (e.g., glass fiber, carbon fiber, commingled carbon/thermoplastic fiber, commingled glass/thermoplastic fiber) is stitched or attached directly onto the metallic insert using a robot performing an automated laying and attaching process. Then, the transparent composite preform and the metallic insert are consolidated using a compression, injection, or injection-compression mold. In some examples, the metallic structure includes holes or meshed portions to allow the transparent resin to interlock.

In other examples, dry reinforcing fibers (e.g., carbon/glass fiber) can stitched/embroidered onto a substrate. The substrate can be made of any material that allows a sewing needle to pass through it. The substrate with the dry fiber stitches is arranged on the metal insert. The substrate and the metal insert are placed in the mold and epoxy (or other thermoset) resin is injected into the cavity to encapsulate the dry reinforcing regions. The local metal cutouts could also filled with the resin at this stage if a transparent resin is used.

In some examples, a carbon fiber prepreg (thermoset or thermoplastic) is directly applied onto the metallic insert using a robot performing an automated laying and attaching process (e.g., automated tape laying) then consolidated in a single step using heat and pressure.

Figure 1B:
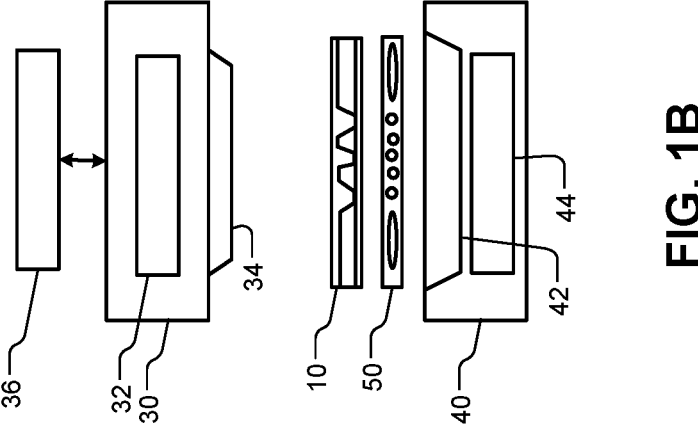
Figure 1A:
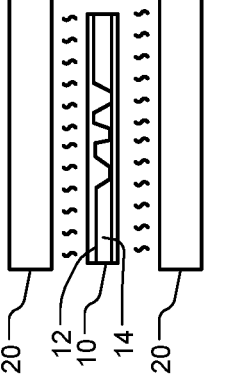
FIG. 1A is a side cross-sectional view of an example of a transparent composite preform according to the present disclosure.

Referring now to FIG. 1A, a transparent composite preform 10 is shown. The transparent composite preform 10 includes reinforcing fibers 12 encapsulated in a transparent resin 14. Heaters 20 are used to heat the transparent composite preform 10 prior to molding.

Referring now to FIGS. 1B and 1C, the transparent composite preform 10 and a metallic insert 50 are arranged between a first die 30 and a second die 40. In FIG. 1B, the first die 30 includes a projecting surface 34 and a heater 32. The second die 40 includes a cavity 42 and a heater 44. In FIG. 1C, the first die 30 and/or the second die 40 are moved by one or more actuators 36 to apply heat and pressure to the transparent composite preform 10 and the metallic insert 50 to consolidate and shape the hybrid transparent composite structure 60.

While a stack is shown that includes the transparent composite preform and the metallic insert, other stack arrangements may be used. For example, a single transparent composite preform and two metallic inserts may be used (in any order). For example, two transparent composite preforms and one metallic insert may be used (in any order). In other examples, multiple transparent composite preforms and multiple metallic inserts may be used (in any order).

Figures 1D, 1E, 1F, 1G:
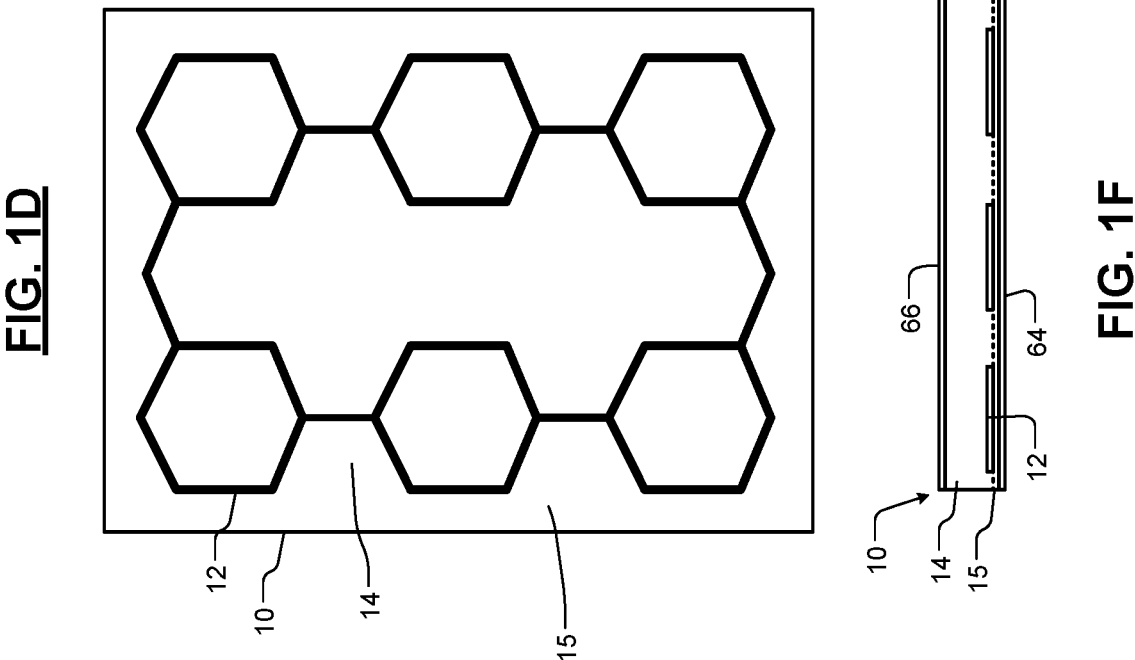
FIG. 1D is a plan view of an example of a transparent composite preform according to the present disclosure.
FIG. 1E is a plan view of an example of a metallic insert including open areas and/or interlocking holes according to the present disclosure.
FIGS. 1F and 1G are side cross-sectional views of examples of composite preforms according to the present disclosure.

Referring now to FIGS. 1D and 1E, the transparent composite preform 10 includes a backing substrate 15. In some examples, the reinforcing fibers 12 are stitched or attached to the backing substrate 15. In some example, the backing substrate 15 is transparent and is made of a material compatible with the transparent resin. In some examples, the reinforcing fibers 12 are placed using automated fiber placement or tailored fiber placement (TFP) methods using robots to place and stitch or otherwise attach the reinforcing fibers to the backing substrate 15. In some examples, the reinforcing fibers 12 include carbon, glass, basalt and/or other reinforcing fibers. In some examples, the reinforcing fibers 12 are commingled with other reinforcing fibers and/or with thermoplastic fibers such as nylon, acrylic, or polycarbonate. In some examples, carbon fiber reinforcing fibers are commingled with polycarbonate fibers and the stitching fiber and the substrate are made of polycarbonate.

In FIG. 1E, an example of the metallic insert 50 is shown. In some examples, the metallic insert 50 includes open areas 74 that are removed from solid areas 78 and that align with transparent areas of the transparent composite preform. Interlocking holes (or meshed portions) 70 may be formed in the solid areas 78 to allow resin to flow through and interlock the metallic insert to the transparent composite preform 10.

Referring now to FIGS. 1F and 1G, the reinforcing fibers 12 in the transparent composite preform 10 can be arranged in different horizontal and/or vertical locations in a thickness direction of the transparent composite preform 10. In FIG. 1F, the reinforcing fibers 12 are arranged adjacent to the backing substrate 15, which is located adjacent to optional outer protective coating layers 64 and 66.

For example, the outer coating may provide scratch resistance, weathering, or other protection. When polycarbonate is used, a scratch resistant coating such as AS4700 from Momentive may be used. When polycarbonate is used, a coating such as Poly(methyl methacrylate) (PMMA) may also be used to improve weathering layer (e.g., yellowing, cracking, or otherwise deteriorating due to UV exposure and scratch and mar).

In FIG. 1G, the reinforcing fibers 12 are arranged adjacent to the backing substrate 15, which is consolidated in the middle of the transparent composite preform 10 using two or more consolidation steps.

Figure 2:
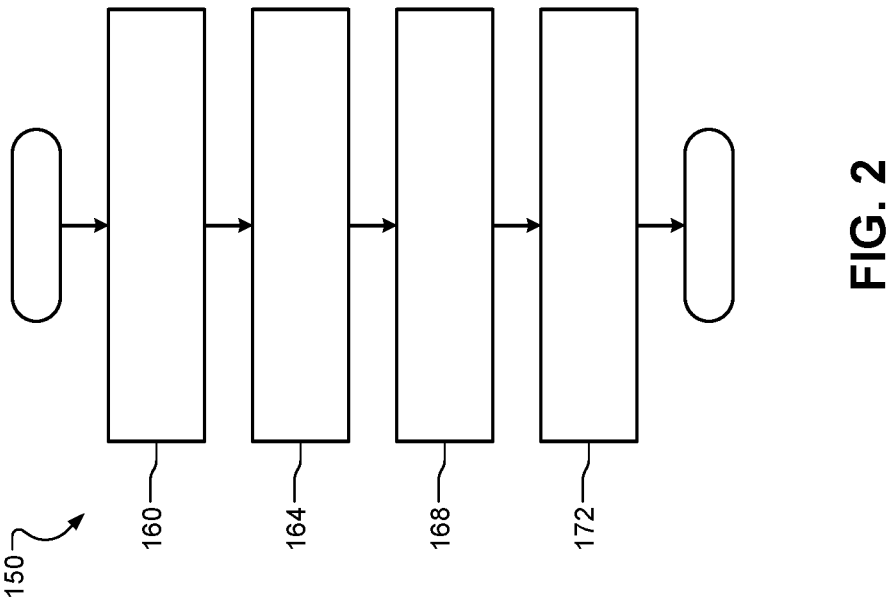
FIG. 2 is a flowchart of an example of a method for fabricating a hybrid transparent composite structure according to the present disclosure.

Referring now to FIG. 2, a method 150 for fabricating the hybrid transparent composite structure 60 is shown. At 160, the transparent composite preform 10 is manufactured. At 164, the metallic insert 50 is provided. In some examples, portions of the metallic insert 50 are cut and/or removed. In other examples, the metallic insert 50 is formed, shaped, and/or stamped. At 168, the transparent composite preform 10 is heated. At 172, the transparent composite preform 10 and the metallic insert 50 are arranged in a mold and heat and pressure are applied to consolidate the transparent composite preform 10 and the metallic insert 50.

Figure 3:
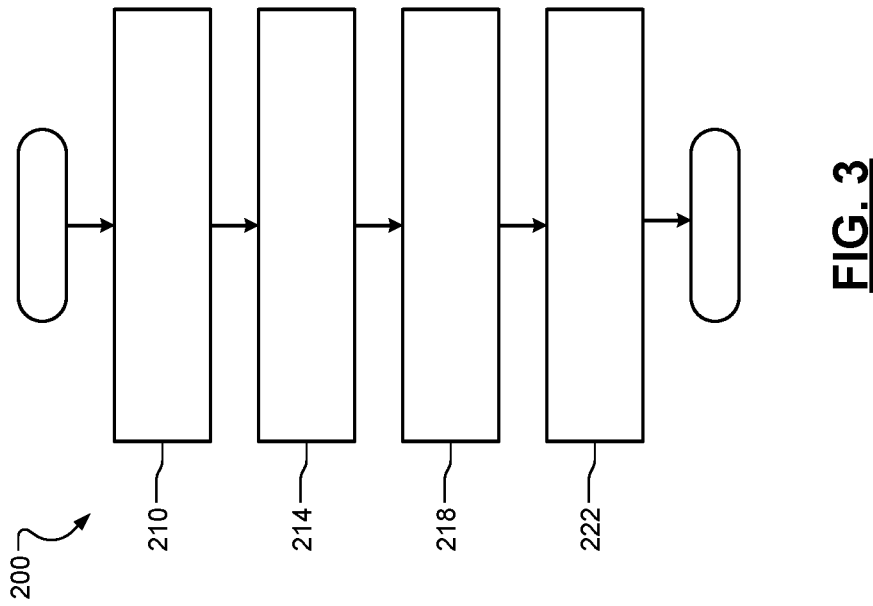
FIG. 3 is a flowchart of an example of a method for fabricating a transparent composite preform according to the present disclosure.

Referring now to FIG. 3, a method 200 for fabricating the transparent composite preform 10 is shown. At 210, the backing substrate 15 is provided. At 214, the reinforcing fibers 12 are attached or stitched to the backing substrate 15. At 218, the reinforcing fibers 12 are consolidated if made of thermoplastic resin. At 222, the reinforcing fibers 12 are encapsulated in the transparent resin 14.

Figure 4C:
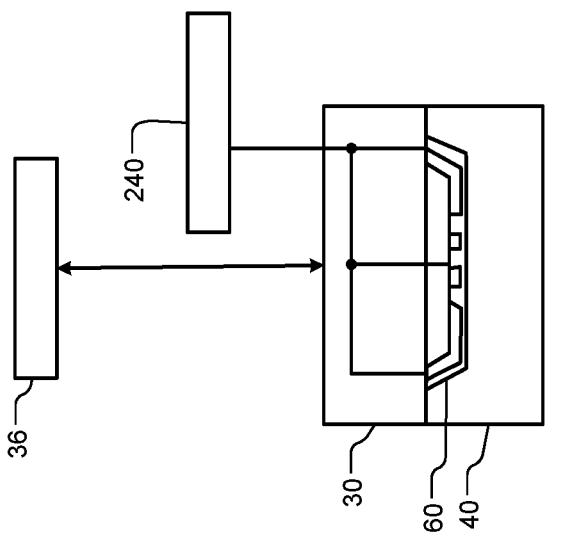
FIGS. 4B and 4C are side cross-sectional views of an example of a transparent composite preform and a metallic insert arranged in an injection mold or compression-injection mold according to the present disclosure.
Figure 4B:
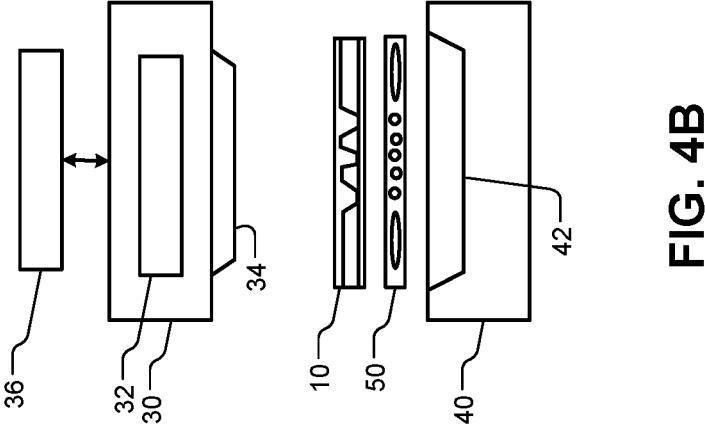
Figure 4A:
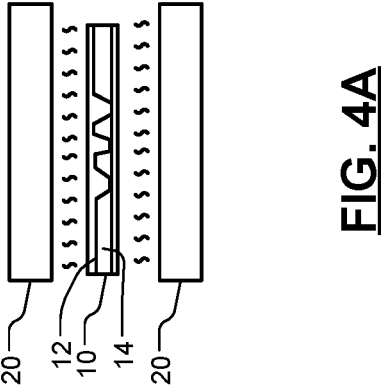
FIG. 4A is a side cross-sectional view of an example of a transparent composite preform according to the present disclosure.

Referring now to FIG. 4A, the transparent composite preform 10 is shown. The transparent composite preform 10 includes the reinforcing fibers 12 encapsulated in the transparent resin 14. Heaters 20 are used to heat the transparent composite preform 10.

Referring now to FIGS. 4B and 4C, the transparent composite preform 10 and the metallic insert 50 are arranged between the first die 30 and the second die 40. In FIG. 4C, the first die 30 is moved by an actuator 36 to apply heat and/or pressure to the transparent composite preform 10 and the metallic insert 50. A resin source injects transparent resin into the cavity 42.

Figure 5:
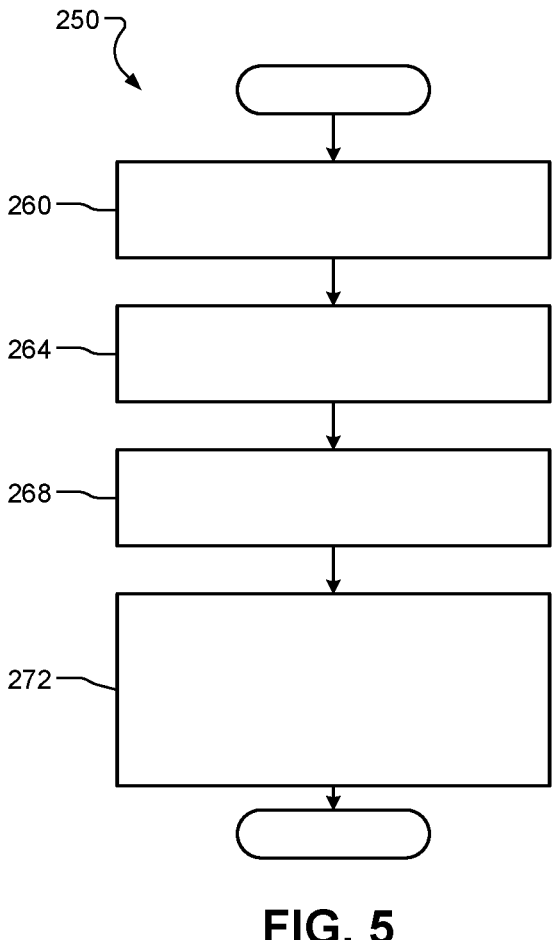
FIG. 5 is a flowchart of an example of another method for fabricating a hybrid transparent composite structure according to the present disclosure.

Referring now to FIG. 5, a method 250 for fabricating a hybrid transparent composite structure is shown. At 260, the transparent composite preform 10 is manufactured. At 264, the metallic insert 50 is provided. In some examples, portions of the metallic insert 50 are cut or removed. In other examples, the metallic insert 50 is formed, shaped, or stamped. At 268, the transparent composite preform 10 is heated. At 272, the metallic insert 50 and the transparent composite preform 10 are arranged in an injection or injection-compression mold, transparent resin is injected, and heat and/or pressure are applied.

Figure 6A:
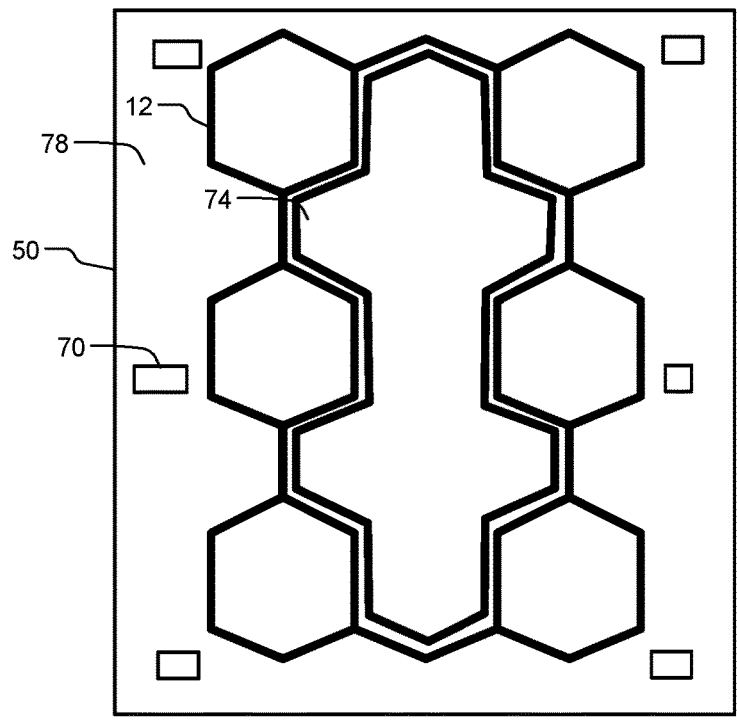
FIG. 6A illustrates an example of reinforcing fibers arranged on a metallic insert according to the present disclosure.
Figure 6B:
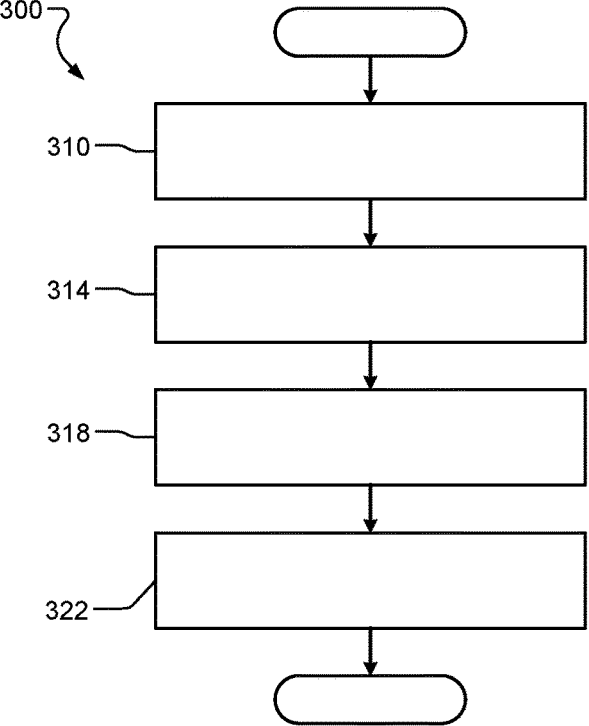
FIG. 6B is a flowchart of an example of another method for fabricating a hybrid transparent composite structure according to the present disclosure.

Referring now to FIGS. 6A and 6B, the reinforcing fibers 12 can be arranged directly on the metallic insert 50 and then the metallic insert 50 and the reinforcing fibers are consolidated.

In FIG. 6B, a method 300 for fabricating the hybrid transparent composite structure is shown. At 310, the metallic insert 50 is provided. In some examples, portions of the metallic insert 50 are cut or removed. In other examples, the metallic insert 50 is formed, shaped, and/or stamped. At 314, the reinforcing fibers 12 are attached to a surface of the metallic insert 50. In some examples, the reinforcing fibers 12 are attached using automated tape layup. At 318, the metallic insert 50 and the reinforcing fibers 12 are optionally heated. At 322, the metallic insert 50 and the reinforcing fibers 12 are consolidated using transparent resin, heat and/or pressure. The transparent resin fills cavities of the metallic insert to create the transparent local portions of the hybrid transparent composite structure.

Figure 7A:
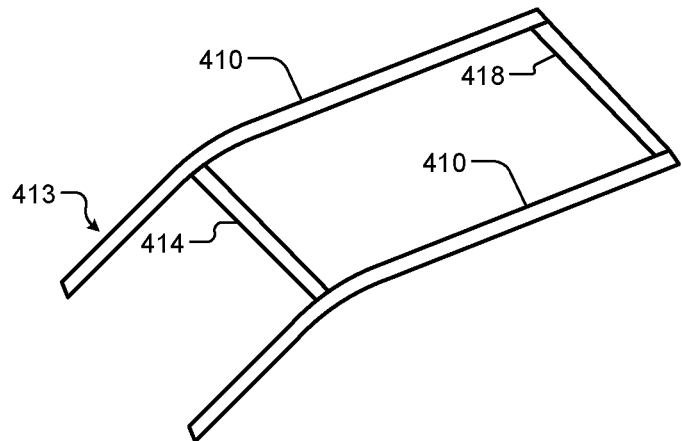
FIGS. 7A and 7B are perspective views of an example of the hybrid transparent composite structure arranged in a vehicle header according to the present disclosure.
Figure 7B:
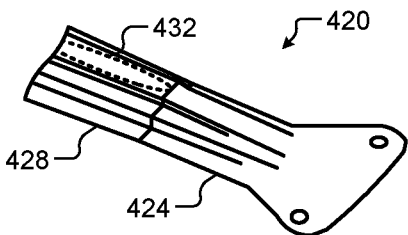

Referring now to FIGS. 7A and 7B, the hybrid transparent composite structure can be arranged in a vehicle header or in an A pillar. In FIG. 7A, vehicle roof rails 410 and 412 extend along an upper portion of a vehicle frame. A front portion of the vehicle roof rails may be part of an A pillar 413. A vehicle front header 414 and/or a vehicle rear header 418 include the hybrid transparent composite structure. In FIG. 7B, a portion 420 of the hybrid transparent composite structure is shown to include a metallic insert 424 that is consolidated with a composite structure 428 including one or more transparent portions 432.

As can be appreciated, the hybrid transparent composite structure can be implemented in a vehicle header for increased occupant/driver visibility. The hybrid construction has reduced cost as compared to 100% transparent composite structures. The hybrid transparent composite structure has reduced mass and improved visibility as compared to 100% metallic headers.

In some examples, the fibers include reinforcing fibers such as carbon fiber. In other examples, the fibers include one or more fibers selected from a group consisting of glass, basalt, flax, hemp, pineapple, and cellulose. In other examples, the fibers are selected from a group consisting of carbon, glass, basalt, flax, hemp, pineapple, and cellulose. In other features, first fibers (selected from a group consisting of carbon, glass, basalt, flax, hemp, pineapple, and cellulose) are commingled with second fibers selected from a group consisting of polycarbonate, nylon, polyetheretherketone (PEEK), polyetherimide (PEI), polyphenylene sulfide (PPS), polyester, polyethylene, and polypropylene) in order to consolidate the fiber preform prior to over-molding. In some examples, the plurality of fibers has a shape selected from the group consisting of cylindrical, flat, or both cylindrical and flat.

Suitable fiber materials may include carbon fibers (e.g., carbon black, carbon nanotubes, talc, fibers derived from polyacrylonitrile and/or pitch precursors), glass fibers (e.g., fiber glass, quartz), basalt fibers, aramid fibers (e.g., KEVLAR®, polyphenylene benzobisoxazole (PBO)), polyethylene fibers (e.g., high-strength ultra-high molecular weight (UHMW) polyethylene), polypropylene fibers (e.g., high-strength polypropylene), natural fibers (e.g., cotton, flax, cellulose, spider silk), and combinations thereof, by way of example. In some examples, the reinforcing fibers comprise fiber tow including one or more continuous fibers and an outer layer surrounding the one or more continuous fibers.

In some examples, the substrate and/or the transparent resin includes one or more materials selected from a group consisting of polycarbonate, polypropylene, epoxy, polyurethane, polymethylmethacrylate, a polyamide, styrene-acrylonitrile, methyl methacrylate-acrylonitrile-butadiene-styrene, styrene methyl methacrylate, a glass fiber backing, polyester, and/or other transparent polymer.

The substrate and/or the transparent resin may be a thermoset layer or a thermoplastic layer that is substantially transparent when free of fibers. In certain aspects, the supporting layer may be a thermoset supporting layer selected from the group consisting of: benzoxazine, a bismaleimide (BMI), a cyanate ester, an epoxy, a phenolic (PF), a polyacrylate (acrylic), a polyimide (PI), an unsaturated polyester, a polyurethane (PUR), a vinyl ester, a siloxane, co-supporting layers thereof, and combinations thereof.

In some examples, the substrate includes a thermoplastic supporting layer selected from the group consisting of: polyethylenimine (PEI), polyamide-imide (PAI), polyamide (PA) (e.g., nylon 6, nylon 66, nylon 12, nylon 11, nylon 6-3-T), polyetheretherketone (PEEK), polyetherketone (PEK), polyvinyl chloride (PVC), a polyphenylene sulfide (PPS), a thermoplastic polyurethane (TPU), polypropylene (PP), polycarbonate/acrylonitrile butadiene styrene (PC/ABS), high-density polyethylene (HDPE), polyethylene terephthalate (PET), poly(methyl methacrylate) (PMMA), styrene methyl methacrylate (SMMA), methyl methacrylate acrylonitrile butadiene styrene (MABS), polycarbonate (PC), polyaryletherketone (PAEK), polyetherketoneketone (PEKK), co-supporting layers thereof, and combinations thereof.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

What is claimed is:

1. A method for fabricating a hybrid transparent composite structure, comprising:
   providing a metallic insert and a transparent composite preform including reinforcing fibers and transparent resin;

heating the transparent composite preform; and
   arranging the metallic insert and the transparent composite preform in a mold and applying at least one of heat and pressure to form the hybrid transparent composite structure,
   wherein at least a portion of the transparent composite preform is not obscured by the metallic insert and allows viewing through the hybrid transparent composite structure,
   wherein the transparent composite preform includes at least one transparent area,
   wherein the metallic insert includes a solid portion defining an open area aligning with the transparent area of the transparent composite preform,
   wherein the solid portion further defines a plurality of mesh portions or interlocking holes located between the open area and an edge of the metallic insert to interlock the metallic insert and the transparent composite preform, and
   wherein the hybrid transparent composite structure is an A pillar.

2. The method of claim 1, wherein providing the transparent composite preform includes:
   stitching the reinforcing fibers to a substrate; and
   encapsulating the reinforcing fibers and the substrate in the transparent resin.

3. The method of claim 2, wherein providing the transparent composite preform includes arranging the reinforcing fibers on the substrate with a robot.

4. The method of claim 1, further comprising at least one of cutting, forming, and shaping the metallic insert prior to applying heat and pressure using the mold.

5. The method of claim 1, further comprising injecting transparent resin into the mold.

6. The method of claim 1, wherein the metallic insert is selected from a group consisting of steel, aluminum, and magnesium.

7. The method of claim 1, wherein the reinforcing fibers comprise a material selected from a group consisting of carbon fibers, glass fibers, and basalt.

8. The method of claim 1, wherein the reinforcing fibers comprise commingled fibers made of at least two different materials.

9. The method of claim 1, wherein the reinforcing fibers including commingled fibers including at least one material selected from a group consisting of carbon fibers, glass fibers, and basalt and at least one material selected from a group consisting of nylon, acrylic, and polycarbonate.

10. The method of claim 9, wherein providing the transparent composite preform includes:
    stitching the reinforcing fibers to a substrate; and
    encapsulating the reinforcing fibers and the substrate in the transparent resin.

11. A method for fabricating a hybrid transparent composite structure, comprising:
    providing a metallic insert and a transparent composite preform including reinforcing fibers and transparent resin;
    heating the transparent composite preform;
    arranging the metallic insert and the transparent composite preform in a mold and applying at least one of heat and pressure to form the hybrid transparent composite structure; and
    connecting the hybrid transparent composite structure between roof rails of a vehicle, wherein at least a portion of the transparent composite preform is not obscured by the metallic insert and allows viewing through the hybrid transparent composite structure, wherein the transparent composite preform includes at least one transparent area, wherein the metallic insert includes a solid portion defining an open area aligning with the transparent area of the transparent composite preform, and wherein the solid portion further defines a plurality of mesh portions or interlocking holes located between the open area and an edge of the metallic insert to interlock the metallic insert and the transparent composite preform.

12. The method of claim 11, wherein providing the transparent composite preform includes:

stitching the reinforcing fibers to a substrate; and encapsulating the reinforcing fibers and the substrate in the transparent resin.

13. The method of claim 12, wherein providing the transparent composite preform includes arranging the reinforcing fibers on the substrate with a robot.

14. The method of claim 11, further comprising at least one of cutting, forming, and shaping the metallic insert prior to applying heat and pressure using the mold.

15. The method of claim 11, further comprising injecting transparent resin into the mold.

16. The method of claim 11, wherein the metallic insert is selected from a group consisting of steel, aluminum, and magnesium.

17. The method of claim 11, wherein the reinforcing fibers comprise a material selected from a group consisting of carbon fibers, glass fibers, and basalt.

18. The method of claim 11, wherein the reinforcing fibers comprise commingled fibers made of at least two different materials.

19. The method of claim 11, wherein the reinforcing fibers including commingled fibers including at least one material selected from a group consisting of carbon fibers, glass fibers, and basalt and at least one material selected from a group consisting of nylon, acrylic, and polycarbonate.

20. The method of claim 19, wherein providing the transparent composite preform includes:

stitching the reinforcing fibers to a substrate; and encapsulating the reinforcing fibers and the substrate in the transparent resin.

* * * * *